Sept. 21, 1965 R. N. CONKLIN ETAL 3,207,919

PULSE CONTROLLED CURRENT DRIVER CIRCUIT

Filed June 30, 1961

INVENTORS
RICHARD N. CONKLIN
ROBERT J. MAJOR
BY [signature]
AGENT 3,207,919

PULSE CONTROLLED CURRENT DRIVER CIRCUIT

Richard N. Conklin, Rhinebeck, and Robert J. Major, Red Hook, N.Y., assignors to International Business Machines Corporation, New York, N.Y., a corporation of New York Filed June 30, 1961, Ser. No. 121,230
9 Claims. (Cl. 307—88.5)

This invention relates to an electronic control device and, more specifically, to one incorporating a bistable device.

In electronic circuits, the bistable device is a basic element capable of responding to an input signal which sets it to one of its stable states and remaining in this stable state until another input signal changes it. Thus, it performs a storage function. The device can be used to control other circuits according to the stable state to which it has been set.

Although the bistable device is used in many fields of electronic control, it is particularly suited for use in digital computers.

Due to the extreme complexity of the circuitry in digital computers, the individual circuit blocks, which perform basic functions such as the storage function, must be extremely reliable and be compatible with a large variety of circuits with which they are interconnected. Like units must be randomly interchangeable and give high performance with low error or failure rate.

Additional problems are encountered where it is desired to operate a computer under environmental conditions in which the circuits are subjected to an extreme range of temperature and other conditions commonly known to be adverse to their operation. For example, such undesirable conditions will be encountered in the operation of a computer under field conditions by military units, where mobility requirements limit the amount of temperature control and shock absorption as well as the amount of space for operational circuitry.

In order to maintain the reliability necessary in such a complex arrangement of circuits as found in digital computers and, particularly, under the extreme ranges of temperature which are encountered in the field, it is desirable to use as few components as possible and which generate as little heat as possible. Although there is much less heat generated in solid state circuits, utilizing, for example, transistors, than in previously used vacuum tube circuits, it is still desirable to achieve a minimum of heat generation. This is particularly due to the large variation of transistor parameters with temperature fluctuation.

A particular problem occurs when driving a high current load, such as is encountered in switching magnetic cores. In the circuits for such an application, it is desirable to have a bistable circuit which dissipates very low power when it is not actively driving a load, but which is capable of driving high current load without utilizing additional current amplifying devices.

A related problem is that of retaining the capacity to rapidly switch a bistable device from one stable state to the other when circuit parameters are selected to make the device stable over a wide range of load current.

Heretofore, the prior art has utilized several types of control circuits to perform the function of driving a high current load with corresponding stability in the low power dissipating bistable device. One such type uses an emitter-follower output on the bistable device and operates on the principle of driving a high impedance input; namely, the base of the transistor. This solution has the obvious drawback of incorporating a non-logic performing but power dissipating device in the circuit.

In another type in which a high current output was to be gated, two transistors were commonly placed in the gating circuit so that one input to the gate would be at the base of one transistor and the bistable device would drive the base of the other transistor.

Accordingly, it is an object of this invention to provide an improved control circuit for controlling a high current load.

It is another object to provide a control circuit compatible with magnetic core logic circuits.

Another object is to provide a circuit having low steady state power consumption when it is turned on but not driving a load.

Another object is to provide an inexpensive control circuit capable of driving a high current load.

It is a further object to provide a circuit capable of controlling a high current pulse with a minimum number of transistors.

It is a further object to provide a circuit which will remain stable while driving a high current load.

It is an object of this invention to provide a bistable circuit having improved switching speed from one to the other of its stable states.

Another object is to provide a single transistor high current gate compatible with a low power bistable device.

In accordance with the foregoing objects, this invention provides a control circuit including a bistable device utilizing two transistors of opposite conductivity types and having a feedback means for changing the proportion of current flowing through the transistors according to the total amount of load current. Accordingly the transistors remain saturated during high current conduction due to the feedback of enough base current to compensate for the increased collector current.

The invention further provides switching pulses of opposite polarity to the bases of the opposite conductivity type transistors so that the circuit may be switched rapidly from one state to another.

The foregoing and other objects, features and advantages of the invention will be apparent from the following more particular description of a preferred embodiment of the invention, as illustrated in the accompanying drawings.

Figure 1:
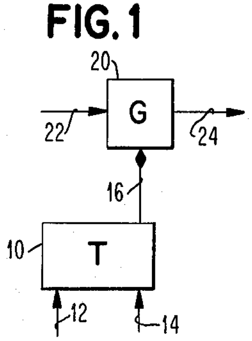
FIG. 1 is a block diagram of a control circuit of the type in which the present invention may be used.

Referring now to the drawings, FIG. 1 is a block diagram of a typical circuit arrangement found in electronic control circuits. The bistable device 10 has an "off" stable state and an "on" stable state. A pulse on input 12 will trigger the bistable device to the "off" state and a pulse at input 14 will trigger the bistable device to its "on" state. Output 16 is connected to a gate 20, which is responsive to both the state of the bistable device 10 and to an input signal at input 22 to generate an output signal at output 24. It is apparent that gate 20 comprises the output load which bistable device 10 must drive in order to insure correct and reliable operation of the circuit.

Figure 2:
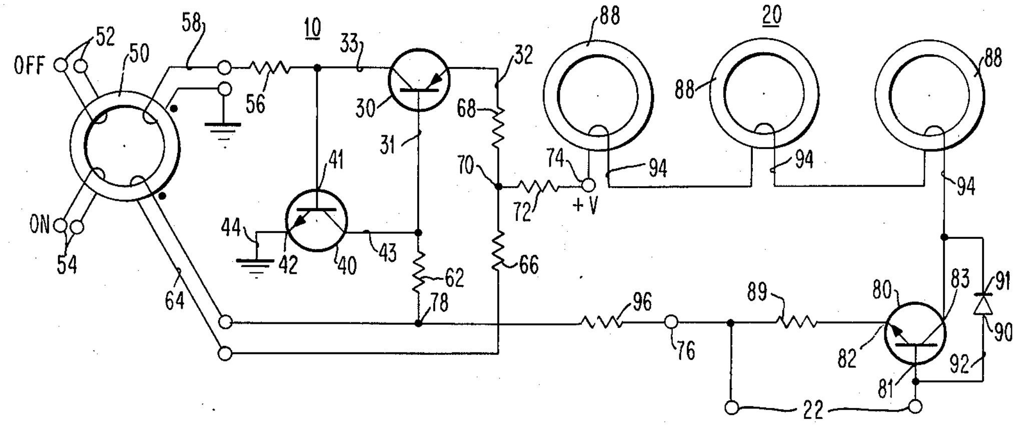
FIG. 2 shows an embodiment of a bistable device incorporated in a circuit including a high current gate circuit.

In FIG. 2 is shown a preferred embodiment of a bistable device 10 and a gate 20, wherein the gate 20 presents a high current load to the bistable device 10.

Bistable device 10 will first be described assuming that it is not driving an output load.

The bistable device 10 is comprised of a PNP transistor 30 and an NPN transistor 40, having base 31 of transistor 30 connected to collector 43 of transistor 40, and base 41 of transistor 40 connected to collector 33 of transistor 30. Emitter 42 of transistor 40 is connected to a voltage source at a terminal 44 arbitrarily selected to be at ground potential.

A magnetic core 50 is utilized to switch the bistable device 10 between its "on" and "off" states. Core 50 is activated by means of a signal applied to input winding 52 to turn the bistable device "off" and to input winding 54 to turn the bistable device "on." Base 41 of transistor 40 is connected through resistor 56 and winding 58 which links core 50 to a ground reference point of a voltage source. The base 31 of transistor 30 is connected through a resistor 62 to a winding 64 which links core 50 in the opposite sense of winding 58. Winding 64 is returned to the emitter 32 of transistor 30 through resistors 66 and 68 in series. Resistors 66 and 68 are connected at terminal point 70 through a resistor 72 to a source of positive voltage 74. Output terminal 76 of the bistable device is connected to junction 78 between resistor 62 and winding 64 through resistor 96.

In the "off" stable state, bistable device 10 will have no current flowing through it from the source of positive voltage 74 to the ground voltage references 60 and 44. In this state, both transistors 30 and 40 are in their high resistance state, so that the voltage at output terminal 76 corresponds approximately to the voltage at source 74. No current is flowing through resistors 62, 66 and 68 to cause a voltage drop between emitter 32 and base 31 of transistor 30 and therefore it is held in the non-conducting state. Since transistor 30 is not conducting, there is no current flowing through resistor 56 to cause the potential at base 41 of transistor 40 to become more positive than emitter 42, therefore, transistor 40 is held in the non-conducting state.

In order to switch the bistable device 10 from its "off" to its "on" stable state, an input pulse is applied to winding 54 of core 50. This pulse switches core 50 in the direction to cause a negative voltage to be applied to base 31 of transistor 30 with respect to the emitter 32 and, at the same time, to cause a positive voltage to be applied at base 41 of transistor 40 with respect to the ground potential source 60. Therefore, both transistor 30 and transistor 40 begin to conduct. When transistor 30 begins to conduct, the current flowing out of its collector 33 through resistor 56 to the ground terminal 60, maintains a positive voltage with respect to ground at the base 41 of transistor 40, thus keeping it in the highly conductive state. With transistor 40 highly conductive, current flow from the source of positive voltage 74 through resistors 72 and 66, winding 64 and resistor 62 to cause the terminal 70 to be biased positively with respect to the base 31 of transistor 30. This causes current to flow from the source of positive voltage 74 through resistors 72 and 68 to the emitter 32 of transistor 30. Emitter 32 of transistor 30 is biased positively with respect to its base and it is maintained in its highly conductive state.

By properly selecting the value of resistor 72, it is possible to cause both tansistors 30 and 40 to saturate at very low current levels and, therefore, to dissipate a small amount of power in this "on" state.

When the bistable device 10 is in its "on" stable state the voltage appearing at output terminal 76 will be near ground potential as determined by the selection of the resistors 62, 66 and 68.

In order to switch bistable device 10 to its "off" state, a signal is applied to winding 52 to switch the core in the opposite direction, thus causing a negative voltage to be applied to base 41 of transistor 40, switching it to its high resistance state. The voltage induced in winding 64 causes the base 31 of transistor 30 to go positive with respect to its emitter, thus switching it to its high resistance state.

In the preceding description, bistable device 10 has been described in its "on" and "off" states assuming that no load is applied to the output terminal 76. The operation of the circuit under high current load conditions will now be described with reference to a gate 20 connected to the output terminal 76. Gate 20 represents a high current load at output terminal 76.

When bistable device 10 is in the "off" stable state, and no current is flowing, the voltage potential at output 76 will be substantially the same as at voltage source 74. Therefore, no voltage differential will be applied across transistor 80 between emitter 82 and collector 83. Even though a voltage is applied across terminals 22 between the base 81 and the emitter 82 of transistor 80, no collector current will flow through the windings of the load cores 88. In this condition, the current will flow from the base 81 to the emitter 82 of transistor 80 and be dissipated in a resistor 89.

Also, when this voltage appears across terminals 22, a high current flows between the base 81 and emitter 82 of transistor 80, and an extreme amount of carrier storage will occur in the collector 83 and cause the transistor, particularly at high temperatures, to be very difficult to turn off. A diode 90 has its cathode 91 connected to the collector 83 of transistor 80 and its anode 92 connected to the base 81 of transistor 80. The purpose of diode 90 is to bleed off the excess carriers and thus speed up the switching time of the transistor 80.

When the bistable device 10 is in its "on" stable state, the collector 83 of transistor 80 will be biased with respect to the emitter by approximately the voltage differential between terminal 74 and ground. With this bias at the collector, a pulse at input terminals 22 of gate 20 will cause the transistor 80 to conduct heavily causing current to flow from voltage terminal 74 through windings 90 to switch the cores 88. The current flows through transistor 80 and into the output terminal 76 of bistable device 10.

With the maximum amount of current flowing in gate 20, it presents a very low impedance at output terminal 76. If this current were to flow only through the collector circuit, for example, of transistor 40, the transistor would be driven out of its saturation region into the active region of operation and tend to make the circuit unstable. However, this cannot happen due to the division of current into two paths as shown more clearly in FIG. 3.

Figure 3:
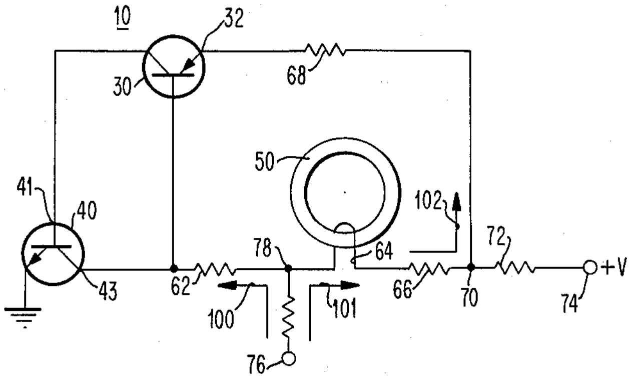
FIG. 3 is a simplified drawing of the embodiment shown in FIG. 2 to more clearly show the direction of current flow when a high current load is driven.

Referring now to FIG. 3, there is shown a simplified drawing of portions of the bistable device 10 of FIG. 2. Identical reference numerals are used to identify corresponding elements in the two figures. When the bistable device 10 is in the "on" stable state, without a substantial load, current will flow through resistor 66 in a direction from terminal 70 toward collector 43 of transistor 40. However, when a heavy current flows into output 76, a portion of it (shown by arrow 100) flows through resistor 62 and into collector 43 of transistor 40, causing the voltage at output 76 to rise slightly due to the increased voltage drop across resistor 62. When the voltage drop at output terminal 76 rises higher than the voltage at terminal 70, a portion of the load current will flow from the output 76 toward emitter 32 of transistor 30 in a direction shown by arrows 101 and 102. This will cause enough of the heavy load current to flow through the emitter 32 of transistor 30 and subsequently into the base 41 of transistor 40 to maintain transistor 40 in the saturated region of operation.

Resistors 62 and 66 are selected to make the ratio of the resistance of resistor 66 to the resistance of resistor 62 approximately equal to the minimum Beta in the saturated region, which is acceptable for transistor 40.

It will be appreciated by those skilled in the art that other high current loads may be driven at output terminal 76 of the bistable device of the present invention. Also, several gates of the type shown may be connected in parallel at output terminal 76.

An illustrative embodiment of this invention includes the following circuit parameters:

| | | |
|---|---|---|
| Transistor **30** | | 2N1131 |
| Transistor **40** | | 2N1252 |
| Resistor **56** | ohms | 150 |
| Resistor **68** | do | 18 |
| Resistor **72** | do | 820 |
| Resistor **66** | do | 62 |
| Resistor **62** | do | 10 |
| Resistor **96** | do | 33 |

While the invention has been particularly shown and described with reference to a preferred embodiment thereof, it will be understood by those skilled in the art that various changes in form and details may be made therein without departing from the spirit and scope of the invention.

We claim:

1. An electronic control device comprising:

a first and second transistor of opposite conductivity type, each having an emitter, a base and a collector with said base of said second transistor connected to said collector of said first transistor;

voltage supply means;

second means including a common resistor connected to said emitter of said first transistor for supplying current from said voltage supply means to said emitter of said first transistor and to said collector of said second transistor, said common resistor having one end connected to said voltage supply means;

output means; and, said second means including current dividing means connected to the other end of said common resistor, said output means and said collector of said second transistor, said current dividing means comprising a first current limiting means between said other end of said common resistor and said output means and a second current limiting means between said output means and said collector of said second transistor for substantially limiting the flow of current into said collector of said second transistor when said second transistor is conducting.

2. An electronic control device comprising:

a first and second transistor of opposite conductivity type, each having an emitter, a base, and a collector with said base of said second transistor connected to said collector of said first transistor;

voltage supply means;

second means including a common resistor connected to said emitter of said first transistor for supplying current from said voltage supply means to said emitter of said first transistor and to said collector of said second transistor, said common resistor having one end connected to said voltage supply means;

output means;

said second means including current dividing means connected to the other end of said common resistor, said output means and said collector of said second transistor, said current dividing means comprising a first current limiting means between said other end of said common resistor and said output means and a second current limiting means between said output means and said collector of said second transistor for substantially limiting the flow of current into said collector of said second transistor when said second transistor is conducting;

a third transistor having a base, a collector and an emitter, said emitter being connected to said output means;

means connecting said collector of said third transistor to said voltage supply means;

means connected to said base of said third transistor for controlling current flow in said third transistor;

whereby current flowing through said third transistor is divided by said current dividing means to flow through both said first and said second current limiting means; and, unidirectional conductive means connected between said base and said collector of said third transistor for reducing the storage effect delay of said third transistor.

3. The device of claim 1 further comprising switching means for said electronic control device including a magnetic core, and wherein said first current limiting means includes a winding linking said magnetic core.

4. The device of claim 1 further comprising switching means including a magnetic core and a flux-linking winding for said core, said winding being connected to said base of said second transistor.

5. The device of claim 1, further comprising:

a magnetic core;

means for switching said magnetic core;

a first winding linked with said magnetic core and connected to said base of said second transistor; and a second winding linked with said magnetic core and connected to said base of said first transistor, whereby switching of the magnetic core will induce voltages of opposite potential at said bases of said first and second transistors.

6. The device of claim 1 further comprising a third transistor having a base, a collector and an emitter, said emitter being connected to said output means;

means connecting said collector of said third transistor to said voltage supply means;

means connected to said base of said third transistor for controlling current flow in said third transistor;

whereby current flowing through said third transistor is divided by said current dividing means to flow through both said first and second current limiting means.

7. A bistable device, comprising:

first and second transistors of opposite conductivity type and each having a base, an emitter and a collector;

said base of said second transistor being connected to said collector of said first transistor;

a voltage source;

a first resistor connected between said voltage source and said emitter of said first transistor;

an output terminal;

a second resistor connected between said output terminal and the junction of said emitter of said first transistor and said first resistor;

a third resistor connected between said output terminal and said collector of said second transistor;

a magnetic core;

a first input winding linking said magnetic core and connected to said base of said second transistor;

a second input winding linking said magnetic core and connected to said base of said first transistor;

whereby a change of flux in said magnetic core will induce opposite voltage potentials at said bases of said first and said second transistors.

8. In a bistable device having low power dissipation in the unloaded condition but capable of driving a high current load, the combination comprising:

first and second transistors of opposite conductivity types, each having an emitter, a base and a collector, said base of each of said first and second transistors being connected to said collector of the opposite of said first and second transistors;

voltage means;

an output terminal;

a first resistor connected between said voltage means and said emitter of said first transistor;

a second resistor connected between the collector of said second transistor and said output terminal; and a third resistor connected between said output terminal and the junction of said emitter of said first transistor and said first resistor.

9. An electronic control device, comprising:

first and second transistors of opposite conductivity type, each having base means, emitter means and collector means, said base means of said second transistor being connected to said collector means of said first transistor;

an output terminal;

voltage means;

means connecting said voltage means to said base, emitter, and collector means of each of said first and said second transistors, said connecting means including a first current limiting means between said voltage means and said emitter means of said first transistor;

a second current limiting means between said output terminal and the junction of said first current limiting means and said emitter of said first transistor; and a third current limiting means between said output terminal and said collector means of said second transistor;

whereby load current flowing through said output terminal will be apportioned between said base means and said collector means of said second transistor according to the impedance of said second and third current limiting means.

References Cited by the Examiner

FOREIGN PATENTS

| | | |
|---|---|---|
| 203,057 | 4/59 | Austria. |
| 1,200,330 | 12/59 | France. |
| 1,230,913 | 9/60 | France. |

OTHER REFERENCES

Seelbach article, I.B.M. Tech. Disclosure Bulletin, vol. 3, No. 4, September 1960, page 55.

JOHN W. HUCKERT, *Primary Examiner.*

GEORGE N. WESTBY, *Examiner.*